(12) United States Patent
Heyer et al.

(10) Patent No.: US 6,382,821 B1
(45) Date of Patent: May 7, 2002

(54) ORNAMENTAL VEHICLE LIGHTING COVER FORMED FROM FLEXIBLE LIGHT TRANSMISSIVE SHEET MATERIAL

(75) Inventors: Cecelia M. Heyer; Beth M. Jerde, both of Maple Plain, MN (US)

(73) Assignee: Excel Products Inc., Maple Plain, MN (US)

( * ) Notice: Subject to any disclaimer, the term of this patent is extended or adjusted under 35 U.S.C. 154(b) by 0 days.

(21) Appl. No.: 09/702,092

(22) Filed: Oct. 30, 2000

(51) Int. Cl.[7] .................................................. F21V 1/00
(52) U.S. Cl. ........................ 362/509; 362/320; 362/456; 362/278; 428/31
(58) Field of Search ................................ 362/509, 320, 362/540, 456, 278; 40/579, 580, 556; 428/31

(56) References Cited

U.S. PATENT DOCUMENTS

| | | |
|---|---|---|
| 2,102,928 A | 12/1937 | Van Leunen |
| 2,119,370 A | 5/1938 | Van Leunen |
| 2,341,822 A | 2/1944 | Seal |
| 3,487,206 A | 12/1969 | Dawson |
| 3,599,596 A * | 8/1971 | Remus et al. ................ 116/334 |
| 4,439,817 A | 3/1984 | Aton |
| 4,894,761 A | 1/1990 | Gran |
| 4,922,386 A | 5/1990 | Böckeler |
| 5,980,067 A | 11/1999 | Albou |
| 6,004,013 A | 12/1999 | Raillard |
| 6,010,234 A * | 1/2000 | Rahn ........................... 362/320 |
| 6,017,138 A | 1/2000 | Reiss |
| 6,019,492 A | 2/2000 | Ikegaya |
| 6,136,392 A * | 10/2000 | Sheffield, Jr. et al. ...... 428/34.1 |
| 6,217,958 B1 * | 4/2001 | Blyden et al. ................ 428/31 |

OTHER PUBLICATIONS

Commercial Products: Rigid Plastic Taillight Covers known as Eclipse, Blackouts, Sportlights by Lund Industries Co., GTS Co. Deflecta Shield Co. and VTech Co.

* cited by examiner

Primary Examiner—Sandra O'Shea
Assistant Examiner—Ronald E. DelGizzi
(74) Attorney, Agent, or Firm—James V Harmon

(57) ABSTRACT

A flexible and ornamental vehicle light cover comprises a flexible piece of sheet material with a pressure sensitive adhesive layer applied to a back surface for bonding the sheet to a vehicle lens that surrounds one of the lamps e.g., an electric tail lamp of the vehicle. The sheet material has an outline depicting a design or symbol that can be seen by an observer whether the light is on or off. The sheet has the multiplicity of punched openings in it to enable light from the vehicle lamp to pass through the sheet for preventing an unacceptable reduction in the luminous flux provided by the vehicle lamp. The sheet is thus able to be applied to the vehicle lens over the lamp by pressing the sheet onto the lens so as to intercept and block no more than the predetermined fraction of the luminous flux impinging thereon while serving to decorate the vehicle.

22 Claims, 2 Drawing Sheets

FIG.6
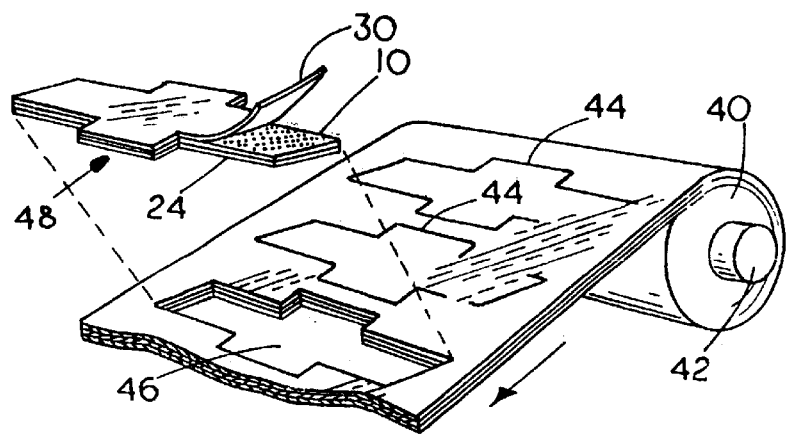
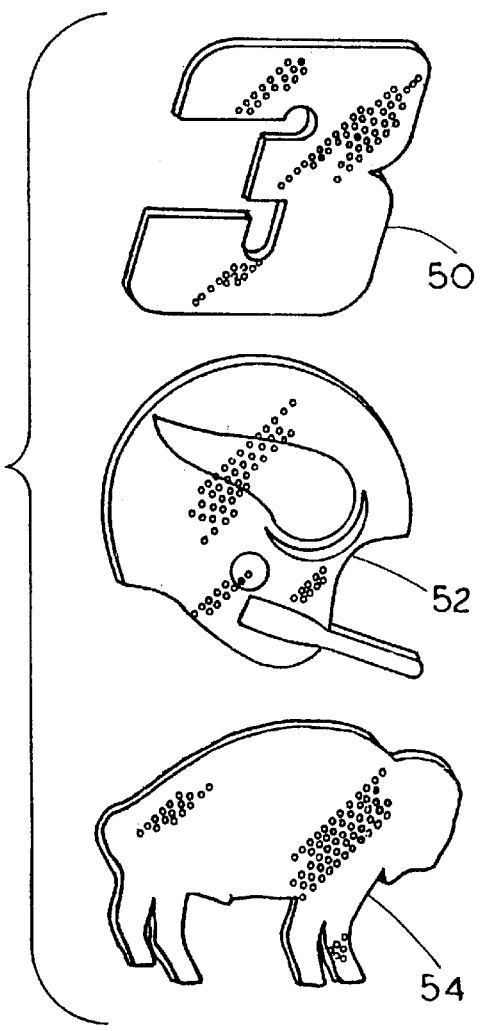
FIG.7

ORNAMENTAL VEHICLE LIGHTING COVER FORMED FROM FLEXIBLE LIGHT TRANSMISSIVE SHEET MATERIAL

FIELD OF THE INVENTION

This invention relates to vehicle lighting and more particularly to ornamental covers suited for vehicle taillights, running lights and fog lights.

BACKGROUND OF THE INVENTION

Various covers have been previously proposed for headlights and taillights of cars and trucks to accomplish different objectives, e.g. shielding or redirecting light or to protect the lights from stones or other objects. In accordance with the present invention and in contrast to the prior art it is conceived that a need exists for a decorative cover which can be used to ornament the lights, e.g. the tail, running lights or fog lights of a car, truck or other vehicle so as to display any well known decorative symbol such as a star, circle, crescent, rectangle or any of various other symbols such as numbers and letters, company or team logos.

However to be suitable, the cover must present a clear representation of the design or figure that can be easily seen and at the same time not reduce unacceptably the amount of luminous flux given off by the vehicle light. The Society of Automotive Engineers regulations, for example, place lower limits on the amount of light emanating from a vehicle taillight. Therefore, it is necessary to make a clear ornamental display while at the same time minimizing light reduction. In addition, however, the cover must be easy for a private individual, the owner of a vehicle, to apply without special tools or training and preferably also easy to remove when no longer needed or when it is to be replaced.

In view of these and other shortcomings of the prior art it is one object to provide a light weight inexpensive and flexible vehicle light cover that does not excessively reduce the luminous flux of light passing through it and yet at the same time is capable of providing ornamentation for the vehicle.

Another object is to provide a decorative light cover that can be applied without tools and can be easily removed for replacement when desired.

Another object is to provide a flexible light cover that promotes the transmission of light therethrough while at the same time providing a clearly visible decorative ornament for the vehicle that remains will remain securely in place on the vehicle lens, is reliable in operation and can be inexpensively produced and easily installed.

These and other more detailed and specific objects of the present invention will be better understood by reference to the following figures and detailed description which illustrate by way of example of but a few of the various forms of the invention within the scope of the appended claims.

THE FIGURES

Figure 3:
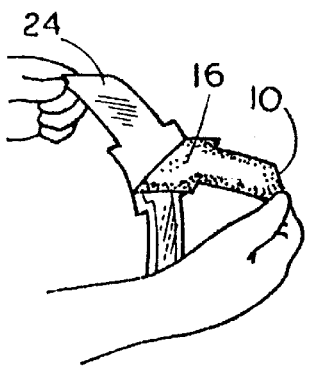
Figure 4:
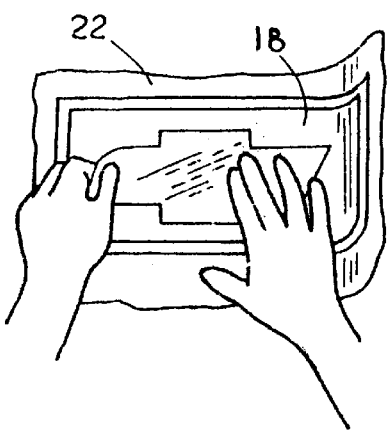
Figure 5:
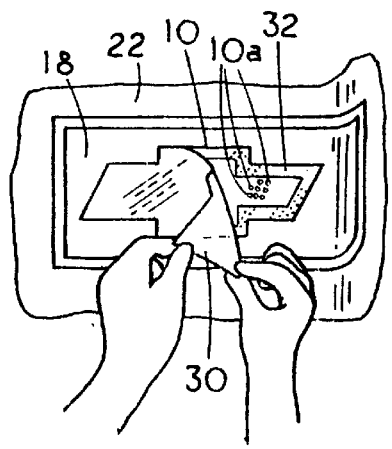

FIGS. 3, 4, & 5 are sequential views showing successive stages of the invention as it is applied to the taillight of a vehicle.

FIG. 6 is a perspective view showing how the invention is cut by stamping it from a sheet of roll stock that is unwound from a roll and, FIG. 7 is a perspective view showing three different examples of patches in accordance with the invention.

SUMMARY OF THE INVENTION

The invention provides a flexible and ornamental vehicle light cover comprising a flexible piece of sheet material with a pressure sensitive adhesive layer applied to a back surface for bonding the sheet to a vehicle lens which partially surrounds or encloses one of the lamps e.g., tail lamp of the vehicle. The sheet material has an outline that depicts a design or symbol which can be seen by an observer whether the light is on or off. The sheet has the multiplicity of punched openings in it to enable the light from the vehicle to pass through the sheet for preventing an unacceptable reduction in the luminous flux provided by the vehicle lamp. The sheet is thus able to be applied to the vehicle lens over the lamp by pressing it onto the lens so as to intercept and block no more than the predetermined fraction of the luminous flux impinging thereon while at the same time serving to decorate the vehicle.

DETAILED DESCRIPTION OF THE INVENTION

Figure 1:
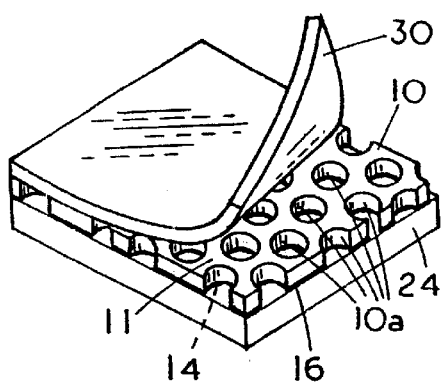
FIG. 1 is a perspective magnified view of a piece of decorative sheet material in accordance with the invention.
Figure 2:
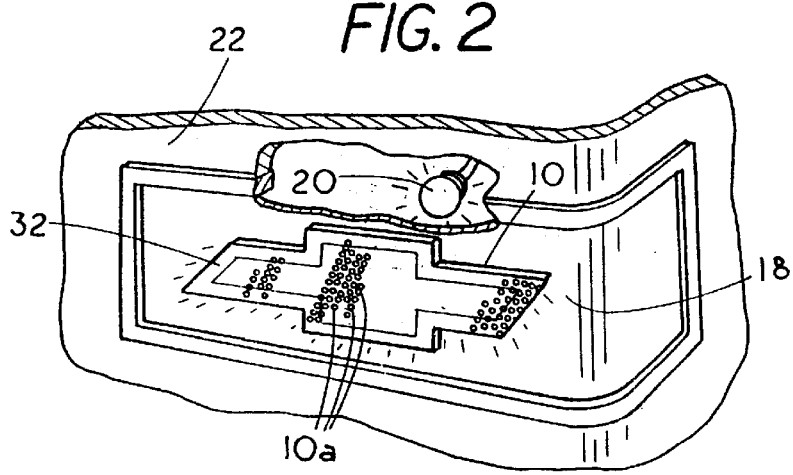
FIG. 2 is a perspective view of the invention applied to the lens of an automobile taillight.

Refer now especially to FIGS. 1–3 which illustrate a flexible sheet embodying the invention indicated generally by the numeral 10. The sheet has a front surface 12 back surface 14 to which is applied a layer of pressure sensitive adhesive 16. During use, the sheet 10 is applied as shown in FIG. 2 to a lens 18 that encloses or covers an electric lamp 20 e.g., a tail lamp of the vehicle 22. The sheet material 10 is provided with a multiplicity of openings 10a across its entire width and breadth to allow light from the lamp 22 to pass through it. For simplicity of nomenclature, the openings 10a will be referred to herein as punched openings, but this term is used broadly to include holes formed in other ways e.g., by laser cutting, casting, melting, etc. Before being applied to the lens 18, the sheet 10 is supported on a backing sheet 24 formed from any suitable non-adherent release paper, parchment or film (FIG. 1). The sheet 10 has a decorative outline of any desired shape such as the shape of a circle, letter, number, oval, square, rectangle, star or any other geometric or fanciful shape to provide attractive ornamentation for the vehicle. One favorite outline is the shape of a company symbol or logo such as the Chevrolet bow tie shape or other automobile emblem, logo or any one of a number of the logos used by professional or amateur sporting clubs such as football or baseball team as shown in FIG. 7 which illustrates a Nascar team number 50, a Viking helmet 52 and a Buffalo Bills logo 54. Thus, a sports fan can apply the invention to the taillights of his or her vehicle for promoting team loyalty and showing spirit and devotion to his or her favorite team.

It is highly preferred but not utterly essential that the sheet be substantially opaque between the openings 10a. This enables the sheet to be capable of providing a contrasting decorative display on the vehicle light that will be visible when the light is on as well as when the light is off. In other words, if the sheet 10 were instead made totally transparent, the light from the lamp 20 would pass through it so readily that it could not provide a decorative display that could be easily seen by an observer. However, by making the sheet 10 substantially opaque, it is capable of providing a visible contrast that allows it to serve as a decorative display for the vehicle.

The sheet 10 can be formed from any suitable sheet material such as paper or plastic film, but the latter is preferred. Good results have been obtained by using a vinyl sheet 7.2 mils in thickness with openings 10a about a ⅟₁₆ in diameter and 11 openings to the inch so as to provide about 42% open area through which light can pass from the bulb 20. The openings 10a can be of any shape but round openings are preferred as shown in the Figures. In this way the light will pass through and be visible to provide effective stop and turn signals.

Any of a variety of pressure sensitive adhesive compositions 16 can be used. Although adhesive that adheres tenaciously can be used, it is preferred to use adhesives with bonding power that is sufficiently light so that the sheet 10 can be removed from the lens 18 when no longer needed or when the sheet needs to be replaced. Pressure sensitive adhesives 16 of various compositions can be used such as mixtures of rubber, resin and a compatible oil. Other pressure sensitive adhesives such as commercial acrylic pressure sensitive adhesives can also be used. One suitable sheet material 10 is a 7.2 mil perforated vinyl sheet sold under the name Clear View V1016 by Spartan International of Holt, Mich. provided with an adhesive 16 comprising an acrylic pressure sensitive adhesive on its lower surface 14. To keep the adhesive 16 fresh, sheet 10 is sold with a removable backing layer 24 applied over the adhesive. Any suitable backing 24 comprising a non-adherent release paper or film can be used. In addition, there is preferably applied over the sheet 10 a commercially available cover or transfer sheet 30 which can be removed as soon as the sheet 10 is applied to the vehicle.

With reference to FIG. 2 it can be seen that the sheet 10 is substantially smaller than the lens 18 and covers only about one third of the entire lens. This enables light from the lamp 20 to pass through the lens 18 on all sides of the decorative sheet 10. The sheet 10 thus has an outline that is spaced inwardly from the edge of the lens 18 so as to present a predetermined design configuration that is visible to an observer viewing the taillight. FIG. 2 also shows how the decorative sheet 10 can be printed for example at 32 along the edge to provide a color-contrasting edge portion.

The open area provided by the punched openings 10a can vary wildly. It is preferred that the open area be between about 30% and 90% of the total area of the patch on sheet 10. Typically, the open area varies between about 20% and 70%. Especially good results have been obtained between about 30% and 50% open. The percentage of open area is matched to the fraction of the lens 18 that is covered so that light reduction does not exceed applicable regulations. This way the substantially opaque body of the sheet material 10 provides a clear depiction of the desired design when the light is either on or off and yet the sheet 10 blocks no more than the predetermined fraction of the luminous flux impinging thereon so as to comply with SAE regulations relating to vehicle lights such as taillights and running lights. Taillight luminosity set by SAE test J585/2040 at a level generally of at least 3.5 cd. It has been found that the present invention is capable of being used widely without reducing illumination below the lower limit set by the SAE. To provide optimum light transmission it is preferred that the patch of sheet material 10 cover only a fraction of the lens 18 such as a third or a fourth of the lens and not the entire lens.

The sheet 10 is preferable removable from the lens 18. Good removability was obtained, for examples, with a pressure sensitive acrylic adhesive that exhibits a peel strength adhesion of about 20 ounces per inch on glass, 22 ounces per inch on stainless steel and 24 ounces per inch on rigid acrylic plastic. The adhesive layer can be from about 0.9 to about 1 mil in thickness.

With peel adhesion at this level, the adhesive holds sheet 10 in place but enables it to be removed from the lens 18 when desired. It is preferred that the patch of sheet material 10 in accordance with the invention cover about a third or less of the entire lens 18.

For most typical applications the patches of sheet material 10 should be light in color e.g., white or a light beige color to provide good color contrast with most vehicle taillights or other lights. While it is highly preferred to provide a color that will provide a good color contrast to the red of a taillight, this is not an utterly essential feature of the invention. The patch 10 can also be colored the same color as the paint color of the car or other vehicle to which it is applied.

Refer now to FIGS. 3–5 which illustrate the application of the invention to a vehicle 22. As shown in FIG. 3, the sheet 10 and a cover sheet or transfer sheet 30 are first removed from the release sheet or backing 24 to expose the adhesive 16. The patch 10 is then applied as shown in FIG. 4 to the lens 18 by pressing it onto the lens 18. Finally in FIG. 5, the cover sheet or transfer sheet 30 is removed from the patch of sheet material 10 by peeling it off as shown.

Refer now to FIG. 6 which illustrates a preferred method of forming the invention. In the Figure is shown a roll of stock material 40 comprising a composite sheet consisting of the layers 10, 24, and 30 bonded together. The roll of stock material 40 is supported on arbor 42 from which it is unwound in a given feed direction. The lines 44 indicate where the roll stock sheet is to be punched to form the decorative patches of sheet material 10. Any suitable commercially available sheet punching equipment known to those skilled in the art can be used. When the pieces are punched out, openings as shown in 46 are produced. The patches 48 that are removed can then be packaged for shipment or storage and are now ready for use as described above.

The invention provides numerous advantages over the prior art. The patches of sheet material 10 are durable, easy to apply without tools, provide a bright contrast on the lens of a taillight or other light of the vehicle so that they can be easily seen when the light is on or when the light is off. At the same time however they do not block so much of the light that they violate existing regulations relating to vehicle light levels. In addition, they can be formed into any suitable abstract design or symbol, letter, number or other ornamental shape as desired and can also be easily removed when no longer needed. The patches of sheet material 10 can also be personalized for example by providing initials of the vehicle owner.

Many variations of the present invention within the scope of the appended claims will be apparent to those skilled in the art once the principles described herein are understood.

What is claimed is:

1. A flexible and ornamental vehicular light cover comprising, a flexible piece of sheet material having a front surface and a back surface, a pressure sensitive adhesive applied to the back surface for bonding the sheet to a lens of a vehicle that encloses a vehicle lamp, the sheet material has an outline providing a representation of a design or symbol that can be seen by an observer when the lamp is turned on or turned off, said sheet has a multiplicity of punched openings therein to enable the light from the vehicle lamp to pass through the sheet so as to permit a predetermined fraction of the luminous flux provided by the lamp to pass therethrough and the sheet is applied to the vehicle lens over the lamp by pressing the sheet onto the lens for intercepting and blocking no more than a predetermined fraction of the luminous flux impinging thereon while serving to decorate the vehicle.

2. The vehicular light cover of claim 1 wherein the part of the sheet between the punched openings is substantially opaque to light.

3. The vehicular light cover of claim 1 wherein the punched openings together define an open area and the open area provided by said punched openings is matched to a fraction of the lens that is covered by the sheet so that the luminous flux from the lamp as a whole is not reduced below a predetermined value.

4. The ornamental vehicular light cover of claim 1 wherein the sheet is formed from a plastic resin, the punched openings are evenly distributed throughout the sheet and each of the openings is less than a quarter of an inch wide.

5. The vehicular light cover of claim 1 wherein the pressure sensitive adhesive is a composition applied to the sheet, a backing sheet is removably applied to cover the adhesive composition and a transfer sheet is removably applied to the front surface of said sheet material.

6. The ornamental vehicular light cover of claim 1 wherein the sheet material comprises about 30% to 90% open area consisting of said punched openings.

7. The vehicular light cover of claim 1 wherein the bonding strength of the adhesive is sufficiently low to enable the sheet to be removed from the lens for disposal or replacement.

8. The light cover of claim 1 wherein the peel strength of the adhesive is between about 20 ounces per inch and 24 ounces per inch.

9. A lighting display for a vehicle comprising an electric lamp mounted on the vehicle, a lens enclosing the lamp, a flexible piece of sheet material having a front surface and a back surface, the sheet is substantially opaque to light so as to be capable of defining a contrasting decorative display on said vehicle lens, an adhesive applied to the back surface of the sheet for bonding the sheet to the lens of said vehicle, the sheet material has an outline providing a design or symbol that can be seen by an observer when the lamp is turned on or turned off, said sheet has a multiplicity of openings therein to enable the light from the vehicle lamp to pass through the sheet so as to permit a predetermined fraction of the luminous flux provided by the lamp to pass therethrough, the sheet is applied to the vehicle lens over the lamp by pressing the sheet onto the lens for intercepting and blocking no more than a predetermined fraction of the luminous flux impinging thereon while serving to decorate the vehicle, the lens has edges and the outline is spaced inwardly from the edges of the lens and has a pre-selected shape defining said design or symbol that is visible to an observer viewing the lens.

10. The lighting display of claim 9 wherein the punched openings together form an open area and the open area of said sheet provided by said punched openings is related to a fraction of the lens that is covered by the sheet so that the total luminous flux from the lamp is not reduced below a predetermined value.

11. The lighting display of claim 9 wherein the sheet is formed from a plastic resin, the punched openings are evenly distributed thereacross, each of the openings is less than a quarter of an inch wide and the sheet material comprises about 30% to 90% open area consisting of said punched openings.

12. The lighting display of claim 9 wherein a backing sheet is removably applied to cover the adhesive layer and the bond strength of the adhesive is controlled to enable the sheet to be removed from the lens.

13. A flexible and ornamental vehicular covering comprising, a flexible piece of sheet material comprising only one layer wherein said one layer has a front surface and a back surface, a pressure sensitive adhesive devoid of magnetic properties applied to the back surface for bonding the sheet to an exposed surface of a vehicle, the sheet material has an outline providing a representation of a design or symbol that can be seen by an observer when viewing the vehicle, said sheet has a multiplicity of separate areas through which light can pass to render the sheet light transmissive when the sheet is applied to the vehicle while also serving to decorate the vehicle.

14. The flexible and ornamental cover of claim 13 wherein the portion of the sheet between the separate areas is substantially opaque to light.

15. The cover of claim 13 wherein the sheet is formed from plastic resin and the separate areas are evenly distributed throughout the sheet and each of the areas is less than a quarter of an inch wide.

16. The covering of claim 13 wherein the pressure sensitive adhesive is an adhesive composition applied to the sheet as a coating, a backing sheet is removably applied to cover the adhesive composition and a transfer sheet is removably applied to the front surface of the sheet material.

17. The covering of claim 13 wherein the separate areas comprise about 30% to about 90% of the area of the sheet.

18. An ornamental covering for a vehicle comprising of a flexible piece of sheet material comprising only one layer wherein said one layer has a front surface and a back surface, the sheet provides a contrasting decorative display on said vehicle, an adhesive devoid of magnetic properties for bonding the sheet to the vehicle, the sheet material has an outline of a defined configuration, said sheet has a multiplicity of separate areas through which light can pass to enable light to be transferred through the sheet so as to permit a predetermined fraction of luminous flux impinging thereon to pass therethrough, the sheet is applied to the vehicle by attaching the sheet to an exposed surface of the vehicle with the adhesive for decorating the vehicle, and the sheet has an outline of a pre-selected shape that defines a design or symbol and is visible to an observer viewing the vehicle and that portion of the sheet other than the separate areas is substantially opaque to the passage of light through said sheet.

19. The ornamental sheet of claim 18 wherein the separate areas comprise punched openings that are spaced apart from one another.

20. The ornamental covering of claim 18 wherein the portion of the sheet other than the separate areas is covered by a coating that is substantially opaque to light such that only light can pass through the separate areas.

21. The ornamental sheet of claim 18 wherein the sheet is formed from flexible plastic resin, the separate areas are evenly distributed thereacross, each of the separate areas is less than a quarter of an inch wide and the separate areas comprise about 30% to about 90% of the area of said sheet.

22. The ornamental sheet of claim 18 wherein a backing sheet is removably applied to cover the adhesive layer such that the sheet can be removably bonded to an exterior surface of a vehicle.

* * * * *